(12) United States Patent
Tsai et al.

(10) Patent No.: US 7,004,614 B2
(45) Date of Patent: Feb. 28, 2006

(54) BACKLIGHT MODULE

(75) Inventors: Yi-Shiuan Tsai, Kaohsiung (TW); Ming-Fa Wang, Miaoli (TW)

(73) Assignee: AU Optronics Corp., Hsinchu (TW)

( * ) Notice: Subject to any disclaimer, the term of this patent is extended or adjusted under 35 U.S.C. 154(b) by 83 days.

(21) Appl. No.: 10/783,204

(22) Filed: Feb. 20, 2004

(65) Prior Publication Data

US 2005/0185424 A1    Aug. 25, 2005

(51) Int. Cl.
*F21V 7/04* (2006.01)
(52) U.S. Cl. .................. 362/633; 362/364; 349/58
(58) Field of Classification Search .......... 362/633, 362/634; 385/88, 92, 93, 94; 349/58; 361/679, 361/683
See application file for complete search history.

(56) References Cited

U.S. PATENT DOCUMENTS

| | | | | |
|---|---|---|---|---|
| 5,479,285 A | * | 12/1995 | Burke | 349/58 |
| 5,570,267 A | * | 10/1996 | Ma | 361/681 |
| 6,404,641 B1 | * | 6/2002 | Fisk et al. | 361/727 |
| 6,507,377 B1 | * | 1/2003 | Jung | 349/60 |
| 6,507,484 B1 | * | 1/2003 | Fukuyoshi | 361/681 |
| 6,527,459 B1 | | 3/2003 | Nishita | 385/92 |
| 6,762,806 B1 | * | 7/2004 | Matsuo et al. | 349/58 |
| 6,876,409 B1 | * | 4/2005 | Park et al. | 349/58 |
| 6,885,411 B1 | * | 4/2005 | Ogawa et al. | 349/58 |
| 6,891,580 B1 | * | 5/2005 | Jang et al. | 349/58 |
| 6,917,395 B1 | * | 7/2005 | Lee | 349/58 |
| 2004/0080952 A1 | * | 4/2004 | Chu et al. | 362/374 |

* cited by examiner

*Primary Examiner*—Stephen Husar
*Assistant Examiner*—Hargobind S. Sawhney
(74) *Attorney, Agent, or Firm*—Thomas, Kayden, Horstemeyer & Risle

(57) ABSTRACT

A backlight module includes a bezel and a reflective shell. The bezel includes a bezel base, a bezel side plate connected to the bezel base, and an engagement structure mounted on an external side surface of the bezel side plate. The reflective shell includes a reflective shell top plate and a reflective shell side plate, which is connected to the reflective shell top plate and has an engagement hole to be engaged with the engagement structure such that the reflective shell is tightly combined with the bezel.

19 Claims, 8 Drawing Sheets

BACKLIGHT MODULE

BACKGROUND OF THE INVENTION

1. Field of the Invention

The invention relates to a backlight module, and more particularly to a backlight module having a reflective shell and a bezel that is tightly combined with the reflective shell.

2. Description of the Related Art

Liquid crystal displays (LCDs) are widely applied in various electrical products such as personal digital assistants (PDAs), notebook computers, digital cameras, digital camcorders, mobile telephones, computer monitors, liquid crystal televisions, and the like because the technology for manufacturing the LCDs are rapidly developed and the LCDs have the advantages of light weight, thin thickness, and power-saving and radiation-free properties. The application field of the LCDs is rapidly expanded because the manufacturers have constructively paid attention to research and development, and adopted large-scale production apparatuses to constantly enhance the quality of the LCDs and reduce the price of the LCDs. However, because the LCD panel of the liquid crystal display is a display panel that cannot emit light rays itself, a backlight module is needed to provide light rays and achieve the display function.

FIG. 1A is a partially exploded view showing a conventional backlight module, and FIG. 1B is a partially enlarged, cross-sectional view showing the backlight module taken along the x-z cross-section of FIG. 1A and viewed from the −y direction. Referring to FIGS. 1A and 1B, the backlight module 10 includes a bezel 11, a light guide plate (LGP) 12, a cold cathode fluorescent lamp (CCFL) 13 and a reflective shell 14. The bezel 11 has a bezel base 11a and several bezel side plates 11b connected to the bezel base 11a. Several protrudent positioning portions 11c are formed on top surfaces of the bezel side plates 11b. The LGP 12 is disposed on the bezel base 11a and has a side surface spaced apart from the bezel side plate 11b by a predetermined distance. The bezel 11 has an inner wall that may be coated with a reflective material, or a reflective plate may further be disposed between the LGP 12 and the bezel base 11a. The CCFL 13 is disposed on the bezel base 11a and is positioned between the bezel side plate 11b and the side surface of the LGP 12. The reflective shell 14 has a reflective shell top plate 14a and a reflective shell side plate 14b connected to the reflective top plate 14a. The reflective shell top plate 14a has several positioning holes 14c corresponding to the protrudent positioning portions 11c, respectively, and each of the positioning holes 14c is close to a connection portion between the reflective shell top plate 14a and the reflective shell side plate 14b. The protrudent positioning portions 11c may be inserted into the positioning holes 14c, respectively, to combine the reflective shell 14 with the bezel 11, as shown in FIG. 1C, wherein the light rays output from the CCFL 13 are reflected by the bezel 11 and the reflective shell 14, and then incident to the LGP 12 via the side surface of the LGP 12. The LGP 12 guides the light rays to be output from a top surface of the LGP 12 so that the light rays may be directly incident to the LCD panel.

However, it is to be noted that the protrudent positioning portion 11c and the positioning hole 14c are simply engaged with each other without any fastening and fixing design. Thus, the reflective shell 14 tends to be separated from the bezel 11 along the z direction when an external force is applied thereto, as shown in FIG. 1D. In this case, the light rays of the CCFL 13 are output from a gap between the reflective shell top plate 14a and the top surface of the LGP 12, and the light-leakage phenomenon, which greatly influences the brightness quality of the backlight module 10, is caused.

SUMMARY OF THE INVENTION

It is therefore an object of the invention to provide a backlight module having an engagement structure and an engagement hole to tightly combine a reflective shell with a bezel, to avoid the light-leakage phenomenon caused by the separation of the reflective shell from the bezel, and to greatly enhance the brightness quality of the backlight module.

The invention achieves the above-identified object by providing a backlight module including a bezel and a reflective shell. The bezel includes a bezel base, a bezel side plate connected to the bezel base, and an engagement structure disposed on an external side surface of the bezel side plate. The reflective shell includes a reflective shell top plate and a reflective shell side plate connected to the reflective shell top plate. The reflective shell side plate has an engagement hole to be engaged with the engagement structure such that the reflective shell and the bezel are tightly combined.

The invention also achieves the above-identified object by providing a backlight module including a bezel, a light guide plate, a light source, and a reflective shell. The bezel includes a bezel base, a bezel side plate connected to the bezel base, and an engagement structure disposed on an external side surface of the bezel side plate. The engagement structure includes a clamping portion and a cantilever portion. The clamping portion protruding over the external side surface of the bezel side plate has a first end connected to the bezel side plate. The cantilever portion protruds over the external side surface of the bezel side plate. The cantilever has a first end connected to the bezel side plate and a second end connected to a second end of the clamping portion. Extending directions of the cantilever portion and the clamping portion are parallel to an extending direction of the bezel side plate, and a width of the cantilever portion is smaller than that of the clamping portion. The light guide plate is disposed on the bezel base and spaced apart from the bezel side plate by a predetermined distance. The light source is disposed on the bezel base and positioned between the bezel side plate and the light guide plate. The reflective shell includes a reflective shell top plate and a reflective shell side plate connected to the reflective shell top plate. The reflective top plate positions above the light source and a bottom surface of the reflective shell top plate closely contacts with a top surface of the light guide plate. The reflective shell side plate has a thickness slightly greater than a distance between part of an inner side surface of the clamping portion and the external side surface of the bezel side plate. The reflective shell side plate has an engagement hole, which has an opening and a sliding slot communicating with the opening. Extending directions of the opening and the sliding slot are parallel to an extending direction of the reflective shell side plate. The opening has a hole width greater than a slot width of the sliding slot. The engagement structure is inserted into the opening such that the clamping portion protrudes over an external side surface of the reflective shell side plate. The cantilever portion slides into the sliding slot while the engagement structure being inserted into the opening such that the clamping portion and the bezel side plate tightly clamp a portion of the reflective shell side plate beside the sliding slot, and the reflective shell and the bezel are tightly combined.

Other objects, features, and advantages of the invention will become apparent from the following detailed description of the preferred but non-limiting embodiment. The following description is made with reference to the accompanying drawings.

DETAILED DESCRIPTION OF THE INVENTION

Figure 1A:
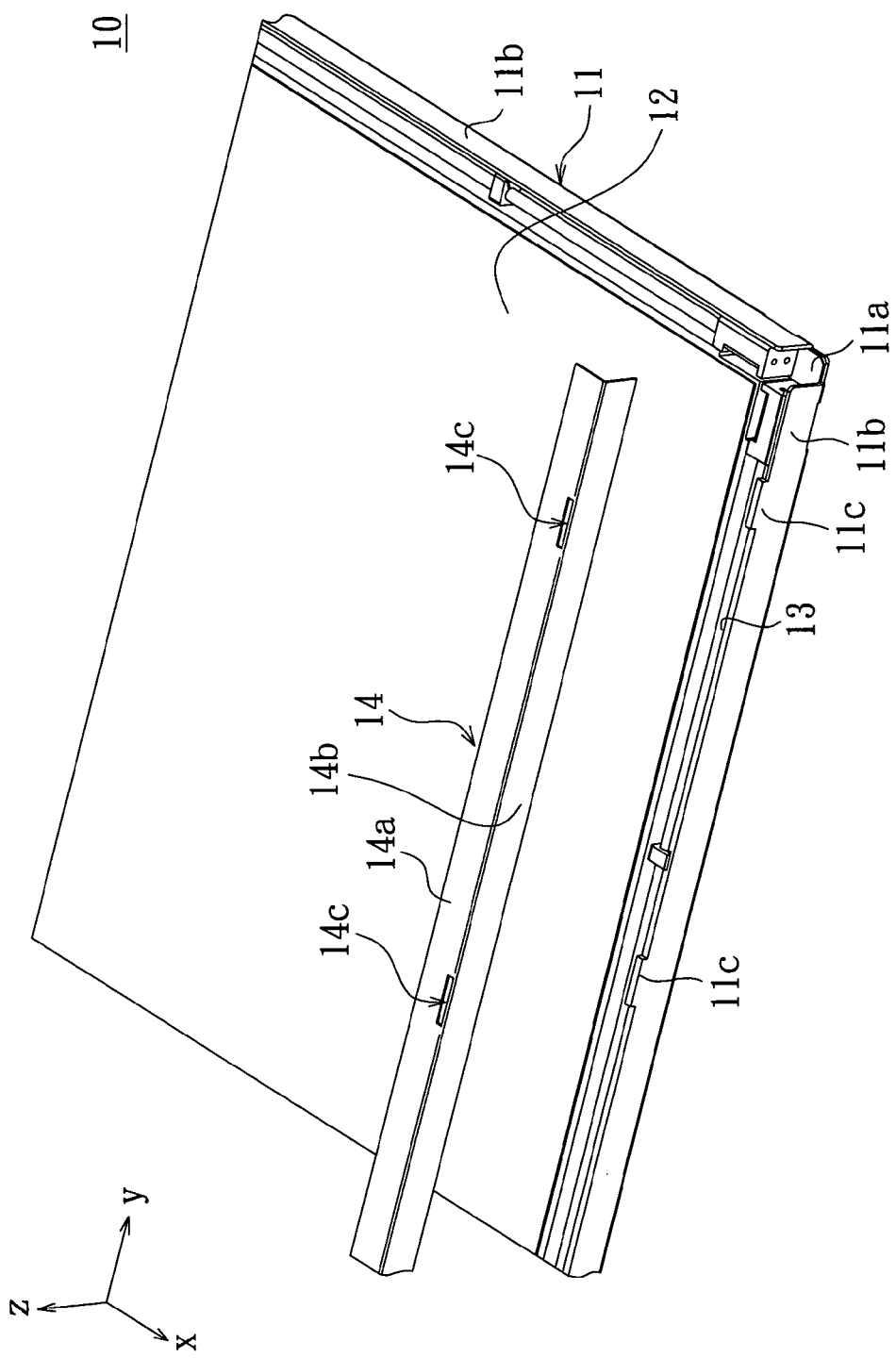
FIG. 1A is a partially exploded view showing a conventional backlight module.
Figure 1B:
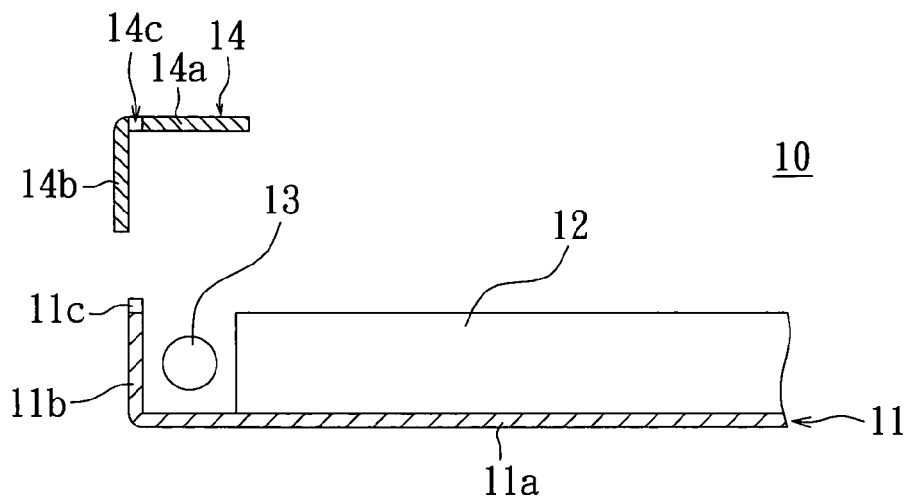
FIG. 1B is a partially enlarged, cross-sectional view showing the backlight module taken along the x-z cross-section of FIG. 1A and viewed from the −y direction.
Figure 1C:
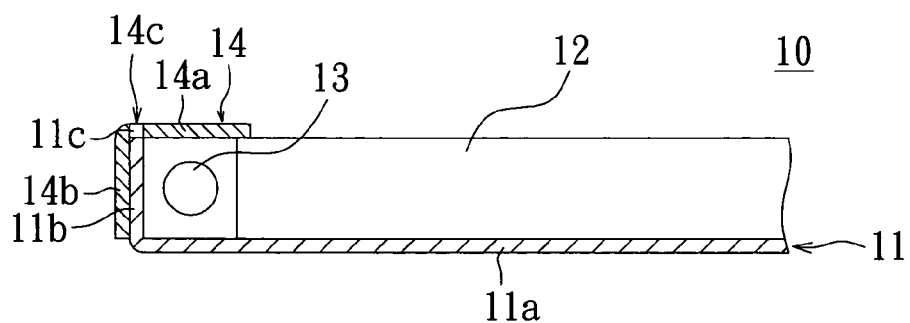
FIG. 1C shows the combination of the backlight module of FIG. 1B.
Figure 1D:
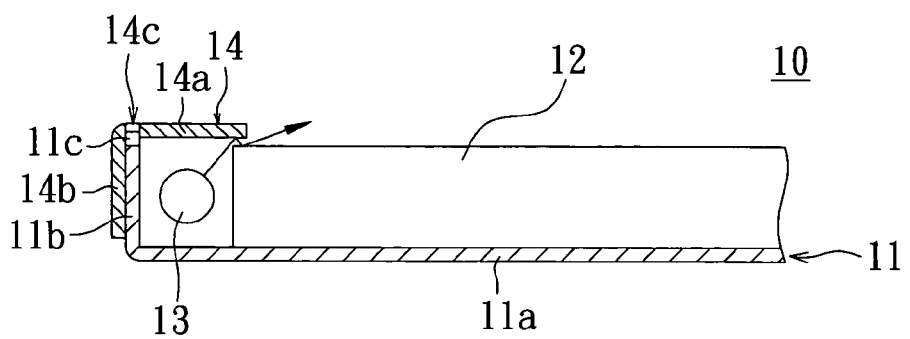
FIG. 1D is a cross-sectional view showing a state when the reflective shell of FIG. 1C is separated from the bezel.
Figure 2:
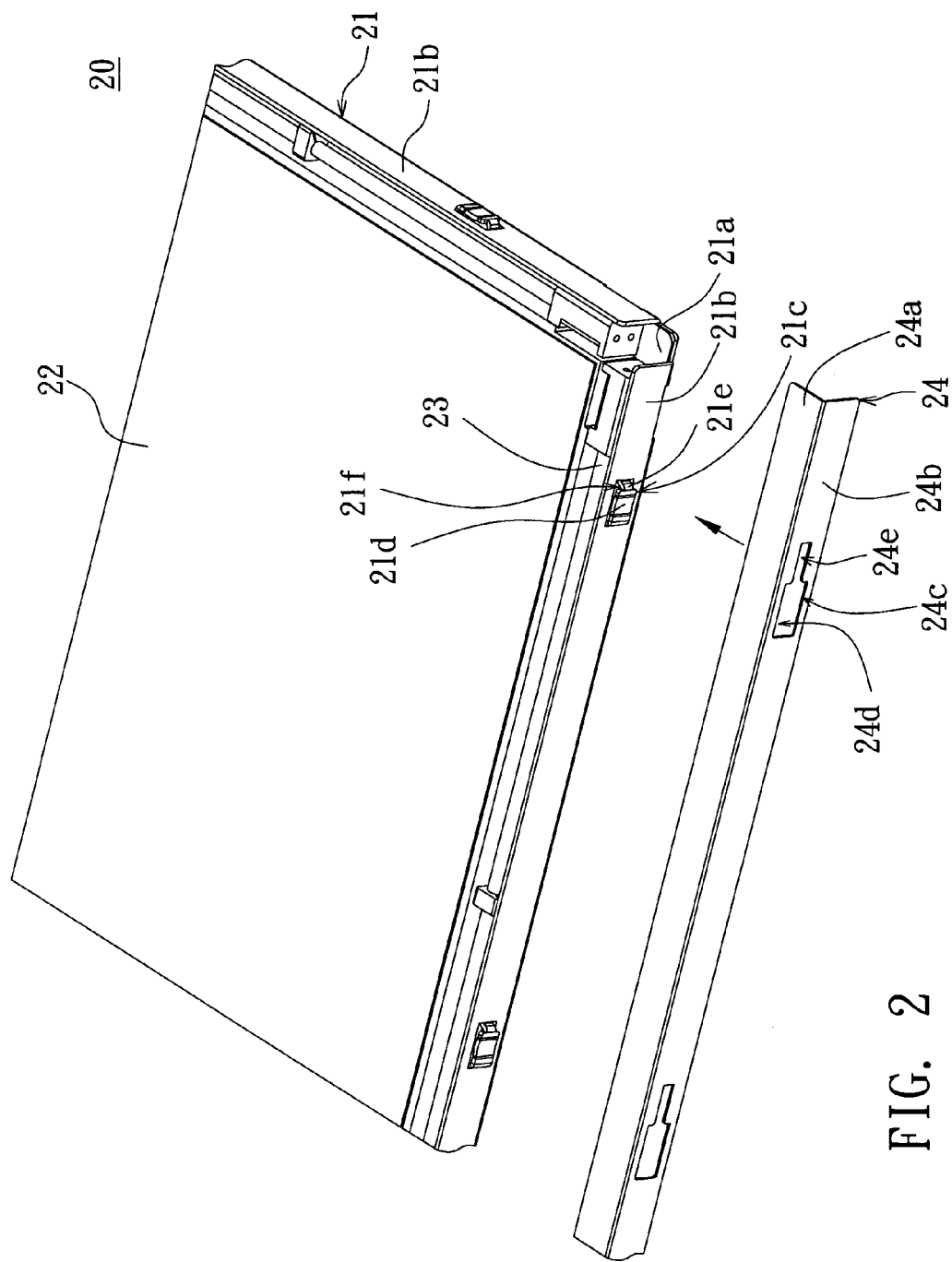
FIG. 2 is a partially exploded view showing a backlight module according to a preferred embodiment of the invention.

FIG. 2 is a partially exploded view showing a backlight module according to a preferred embodiment of the invention. Referring to FIG. 2, the backlight module 20 includes a bezel 21, a light guide plate (LGP) 22, a light source 23, and a reflective shell 24. The bezel 21 has a bezel base 21a and several bezel side plates 21b connected to the bezel base 21a. At least one engagement structure 21c is formed on an external side surface of the bezel side plate 21b. The LGP 22 is disposed on the bezel base 21a and is spaced apart from the bezel side plate 21b by a predetermined distance. The light source 23 is disposed on the bezel base 21a and positioned between the bezel side plate 21b and the LGP 22. The reflective shell 24 has a reflective shell top plate 24a and a reflective shell side plate 24b that are connected together. The reflective shell side plate 24b has at least one engagement hole 24c, which is similar to a T-shaped opening.

Figure 3:
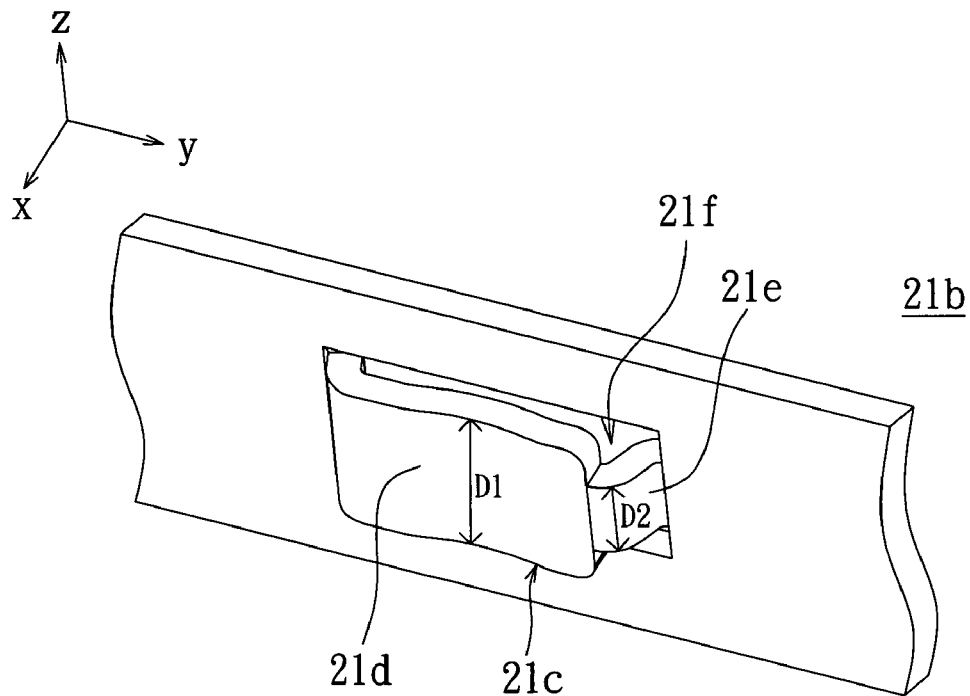
FIG. 3 is a partially enlarged view showing the bezel side plate of FIG. 2.
Figure 4:
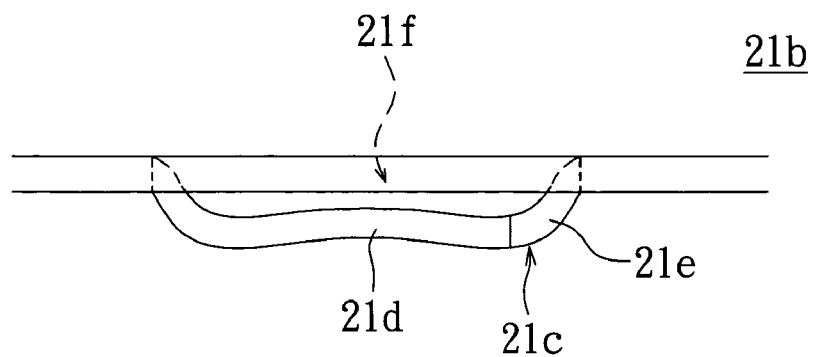
FIG. 4 is a partially enlarged top view showing the bezel side plate of FIG. 2.

FIG. 3 is a partially enlarged view showing the bezel side plate of FIG. 2. FIG. 4 is a partially enlarged top view showing the bezel side plate of FIG. 2. Referring to FIGS. 3 and 4, each engagement structure 21c includes a clamping portion 21d and a cantilever portion 21e. The clamping portion 21d and the cantilever portion 21e, both of which protrude over the external side surface of the bezel side plate 21b, have first ends connected to the bezel side plate 21b, respectively, and second ends connected to each other. The extending directions of the clamping portion 21d and the cantilever portion 21e are parallel to the extending direction (i.e., y direction) of the bezel side plates 21b. The width D1 of the clamping portion 21d is greater than the width D2 of the cantilever portion 21e. In addition, the bezel side plate 21b may have several through holes 21f. The clamping portion 21d protrudes over the external side surface of the bezel side plate 21b with its first end connected to a hole wall of the through hole 21f. The cantilever portion 21e protrudes over the external side surface of the bezel side plate 21b with its first end connected to another hole wall of the through hole 21f. It is to be noted that the distance between part of the inner side surface of the clamping portion 21d and the external side surface of the bezel side plate 21b is slightly smaller than the thickness of the reflective shell side plate 24b.

Figure 5:
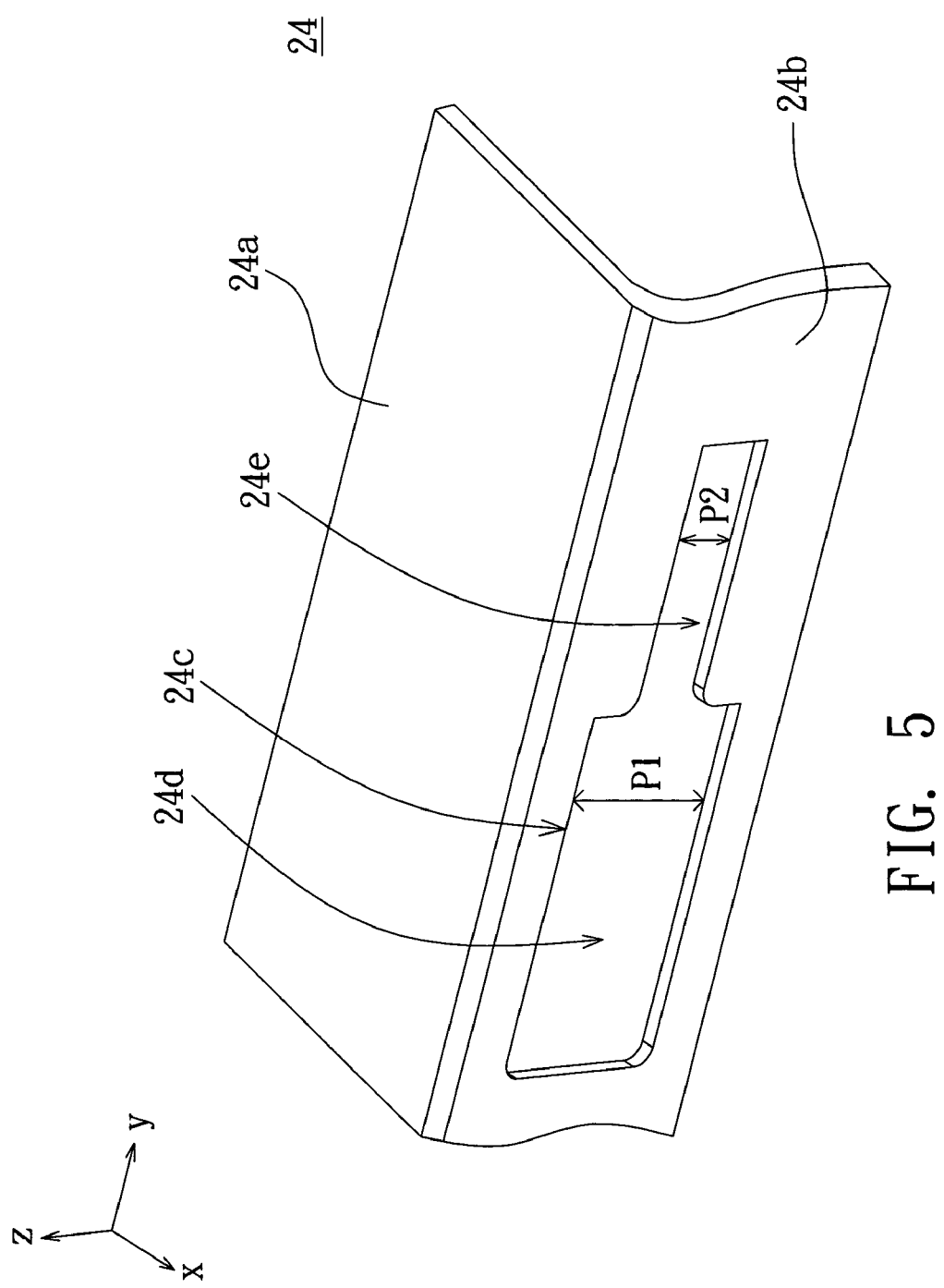
FIG. 5 is a partially enlarged view showing the reflective shell of FIG. 2.
Figure 6:
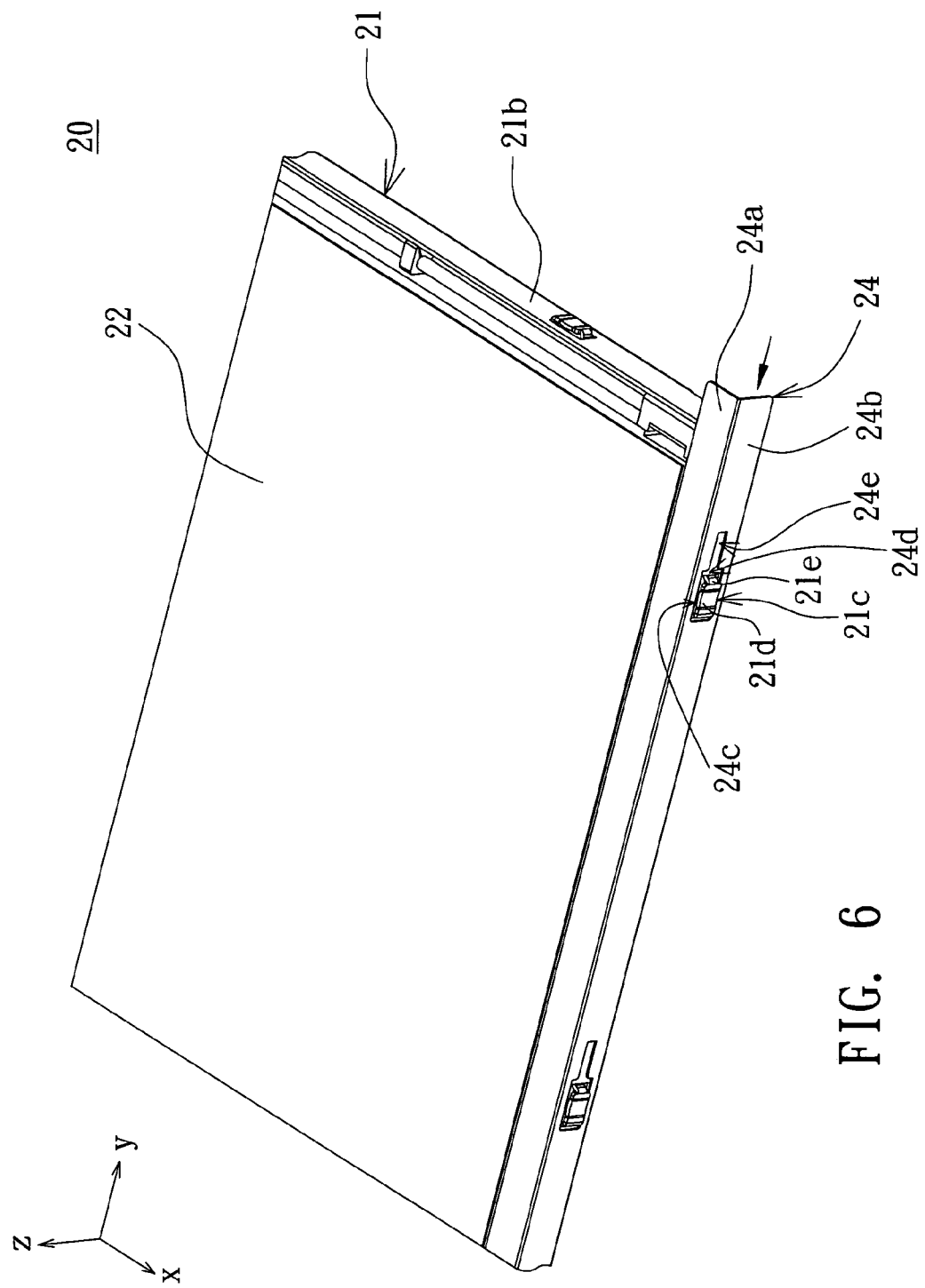
FIG. 6 is a schematic illustration showing a state when the engagement structure of the reflective shell of FIG. 2 is inserted into the opening of the engagement hole of the bezel.
Figure 7:
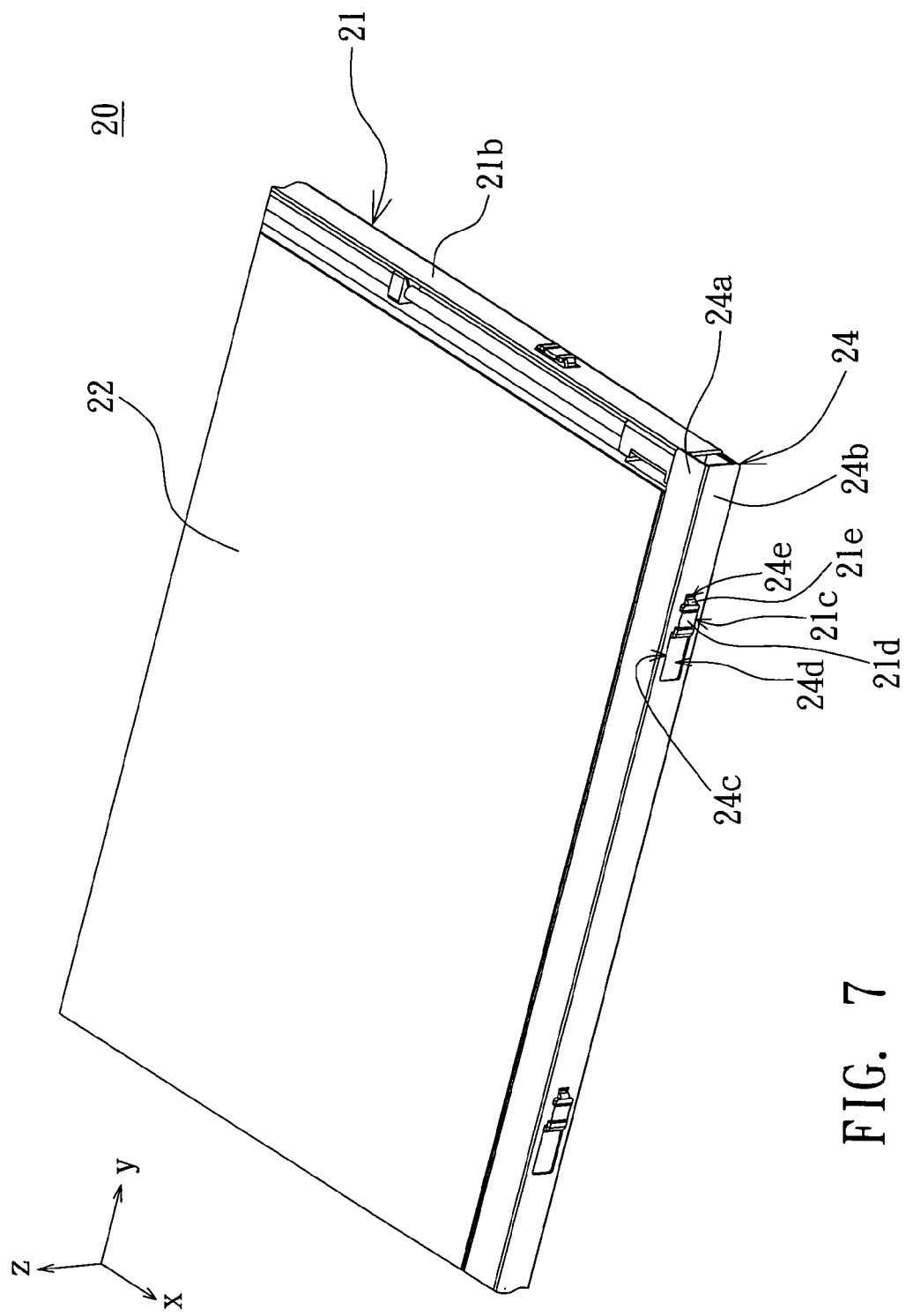
FIG. 7 is a schematic illustration showing a combination of the reflective shell and the bezel of FIG. 2.
Figure 8:
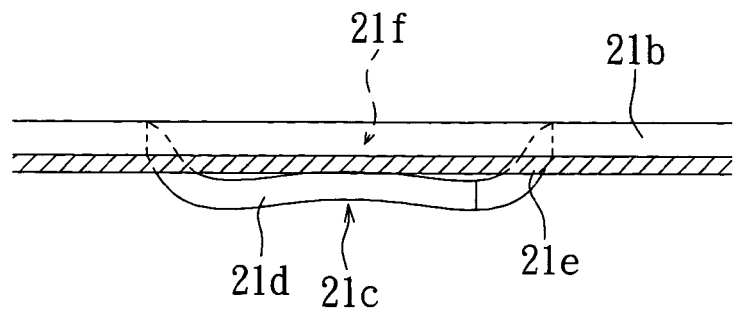
FIG. 8 is a partial top view showing the reflective shell and the bezel of FIG. 2 that are combined together.

FIG. 5 is a partially enlarged view showing the reflective shell of FIG. 2. The engagement hole 24c has an opening 24d and a sliding slot 24e communicating with the opening 24d. The openings 24d and the sliding slot 24e are for receiving the engagement structure 21c. The extending directions of the opening 24d and the sliding slot 24e are parallel to the extending direction (i.e., y direction) of the reflective shell side plate 24b. The hole width P1 of the opening 24d along the z-direction is greater than the slot width P2 of the sliding slot 24e along the z-direction. The slot width P2 of the sliding slot 24e along the z-direction is larger than or equal to the width D2 of the cantilever portion 21e along the z-direction, but smaller than the width D1 of the clamping portion 21d along the z-direction. The distance or gap formed between the clamping portion 21d and the external side surface of the bezel side plate 21b along the x-direction is larger than or equal to the thickness of part of the reflective shell side plate 24b beside the sliding slot 24e along the x-direction. The engagement structure 21c may be inserted into the opening 24d with the clamping portion 21d and the cantilever portion 21e protruding over the external side surface of the reflective shell side plate 24b, as shown in FIG. 6. When the reflective shell 24 of FIG. 6 is pushed toward the (−y) direction, the cantilever portion 21e slides into the sliding slot 24e while the engagement structure 21c being inserted into the opening 24d. Thus, the clamping portion 21d and the bezel side plate 21b may tightly clamp part of the reflective shell side plate 24b beside the sliding slot 24e, and the effect of tightly combining the reflective shell 24 with the bezel 21 may be achieved, as shown in FIGS. 7 and 8. In other word, part of the reflective shell side plate 24b is positioned between the clamping portion 21d and the bezel side plate 21b. The gap formed between the clamping portion 21d and the external side surface of the bezel side plate 21b can receive the part of the reflective shell side plate 24b beside the sliding slot 24e. At the same time, the reflective shell top plate 24a is positioned above the light source 23, and a bottom surface of the reflective shell top plate 24a closely contacts with a top surface of the light guide plate 22.

Figure 9:
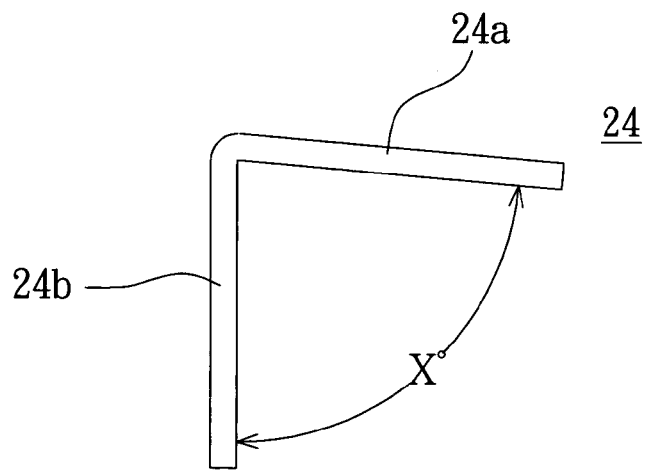
FIG. 9 is a side view showing the reflective shell of FIG. 2.
Figure 10:
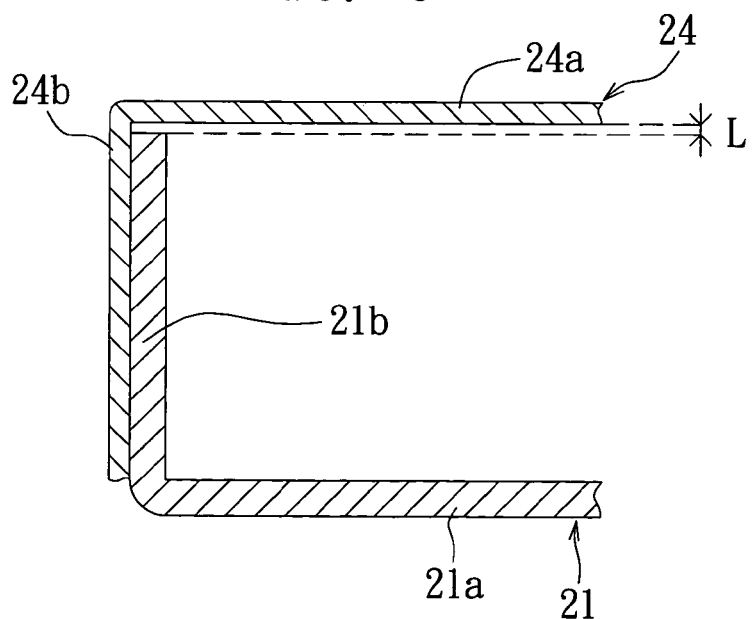
FIG. 10 is a partial side view showing the reflective shell and the bezel of FIG. 2 that are combined together.

However, one of ordinary skill in the art may understand that the technology of the invention is not limited thereto. As shown in FIG. 9, an angle X between the reflective shell top plate 24a and the reflective shell side plate 24b ranges from 80 to 90 degrees, which enables the bottom surface of the reflective shell top plate 24a to be in close contact with the top surface of the LGP 22 when the reflective shell 24 and the bezel 21 are combined. The angle X may further avoid the light-leakage phenomenon. In addition, as shown in FIG. 10, an interval L is defined between the bottom surface of the reflective shell top plate 24a and the top surface of the bezel side plate 21b, and the interval L may serve as a buffer gap when the reflective shell 24 and the bezel 21 are combined. In addition, the light source 23 may be, for example, a cold cathode fluorescent lamp (CCFL), and the bezel base 21a, the bezel side plate 21b and the engagement structure 21c may be integrally formed into a one-piece molded structure.

The backlight module disclosed according to the embodiment of the invention has the engagement configuration including the engagement structure and the engagement hole may really achieve the object of tightly combining the reflective shell with the bezel, avoid the light-leakage phenomenon caused by the separation of the reflective shell from the bezel, and greatly enhance the brightness quality of the backlight module.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight module, comprising:
a bezel, comprising:
a bezel base;
a bezel side plate connected to the bezel base; and
an engagement structure disposed on an external side surface of the bezel side plate, comprising:
a clamping position protruding over the external side surface of the bezel side plate and having a first end connected to the bezel side plate, wherein a distance between part of an inner side surface of the clamping portion and the external side surface of the bezel side plate is smaller than a thickness of the reflective shell side plate; and
a cantilever portion protruding over the external side surface of the bezel side plate and having a first end connected to the bezel side plate and a second end connected to a second end of the clamping portion, wherein extending directions of the cantilever portion and the clamping portion are parallel to an extending direction of the bezel side plate, and a width of the cantilever portion is smaller than that of the clamping portion; and
a reflective shell, comprising:
a reflective shell top plate; and
a reflective shell side plate connected to the reflective shell top plate, the reflective shell side plate having an engagement hole to be engaged with the engagement structure so as to tightly combine the reflective shell with the bezel.

2. The backlight module according to claim 1, wherein the engagement hole has an opening and a sliding slot communicating with the opening, extending directions of the opening and the sliding slot are parallel to an extending direction of the reflective shell side plate, the opening has a hole width greater than a slot width of the sliding slot, the engagement structure is inserted into the opening such that the clamping portion and the cantilever portion protrude over an external side surface of the reflective shell side plate, the cantilever portion slides into the sliding slot while the engagement structure is inserted into the opening such that the clamping portion and the bezel side plate tightly clamp part of the reflective shell side plate beside the sliding slot.

3. A backlight module, comprising:
a bezel, comprising:
a bezel base;
a bezel side plate connected to the bezel base; and
an engagement structure disposed on an external side surface of the bezel side plate, comprising:
a clamping portion protruding over the external side surface of the bezel side plate and having a first end connected to a hole wall of the through hole, wherein a distance between part of an inner side surface of the clamping portion and the external side surface of the bezel side plate is smaller than a thickness of the reflective shell side plate; and
a cantilever portion protruding over the external side surface of the bezel side plate and having a first end connected to another hole wall of the through hole and a second end connected to a second end of the clamping portion, wherein extending directions of the cantilever portion and the clamping portion are parallel to an extending direction of the bezel side plate, and a width of the cantilever portion is smaller than that of the clamping portion; and
a reflective shell, comprising:
a reflective shell top plate; and
a reflective shell side plate connected to the reflective shell top plate, the reflective shell side plate having an engagement hole to be engaged with the engagement structure so as to tightly combine the reflective shell with the bezel.

4. The backlight module according to claim 3, wherein the engagement hole has an opening and a sliding slot communicating with the opening, extending directions of the opening and the sliding slot are parallel to an extending direction of the reflective shell side plate, the opening has a hole width greater than a slot width of the sliding slot, the engagement structure is inserted into the opening such that the clamping portion protrudes over an external side surface of the reflective shell side plate, the cantilever portion slides into the sliding slot while the engagement structure is inserted into the opening such that the clamping portion and the bezel side plate tightly clamp part of the reflective shell side plate beside the sliding slot.

5. A backlight module, comprising:
a bezel, comprising:
a bezel base;
a bezel side plate connected to the bezel base; and
an engagement structure disposed on an external side surface of the bezel side plate; and
a reflective shell, comprising:
a reflective shell top plate; and
a reflective shell side plate connected to the reflective shell top plate, the reflective shell side plate having an engagement hole to be engaged with the engagement structure so as to tightly combine the reflective shell with the bezel, wherein the engagement hole is a T-shaped opening.

6. A backlight module, comprising:
a bezel, which comprises:
a bezel base;
a bezel side plate connected to the bezel base; and
an engagement structure disposed on an external side surface of the bezel side plate, the engagement structure comprising:
a clamping portion protruding over the external side surface of the bezel side plate and having a first end connected to the bezel side plate; and
a cantilever portion protruding over the external side surface of the bezel side plate and having a first end connected to the bezel side plate and a second end connected to a second end of the clamping portion, wherein extending directions of the cantilever portion and the clamping portion are parallel to an extending direction of the bezel side plate, and a width of the cantilever portion is smaller than that of the clamping portion;
a light guide plate disposed on the bezel base and spaced apart from the bezel side plate by a predetermined distance;

a light source disposed on the bezel base and positioned between the bezel side plate and the light guide plate; and a reflective shell, which comprises:

a reflective shell top plate positioned above the light source, and a bottom surface of the reflective shell top plate closely contacting with a top surface of the light guide plate; and a reflective shell side plate connected to the reflective shell top plate, the reflective shell side plate having a thickness greater than a distance between part of an inner side surface of the clamping portion and the external side surface of the bezel side plate, to reflective shell side plate having an engagement hole, which has an opening and a sliding slot communicating with the opening, extending directions of the opening and the sliding slot being parallel to an extending direction of the reflective shell side plate, the opening having a hole width greater than a slot width of the sliding slot, wherein the engagement structure is inserted into the opening such that the clamping portion protrudes over an external side surface of the reflective shell side plate, the cantilever portion slides into the sliding slot while the engagement structure is inserted into the opening such that the clamping portion and the bezel side plate tightly clamp part of the reflective shell side plate beside the sliding slot, and the reflective shell and the bezel are tightly combined.

7. The backlight module according to claim 6, wherein the engagement structure, the bezel base and the bezel side plate are integrally formed into a one-piece molded structure.

8. The backlight module according to claim 6, wherein the engagement hole is a T-shaped opening.

9. The backlight module according to claim 6, wherein an angle between the reflective shell top plate and the reflective shell side plate ranges from 80 to 90 degrees.

10. The backlight module according to claim 6, wherein an interval is defined between the bottom surface of the reflective shell top plate and a top surface of the bezel side plate.

11. The backlight module according to claim 6, wherein the light source is a cold cathode fluorescent lamp.

12. A backlight module, comprising:

a bezel, comprising:

a bezel side plate; and an engagement structure disposed on an external side surface of the bezel side plate, comprising:

a clamping portion protruding over the external side surface of the bezel side plate and having a first end connected to the bezel side plate; and a cantilever portion protruding over the external side surface of the bezel side plate and having a first end connected to the bezel side plate and a second end connected to a second end of the clamping portion, wherein a width of the cantilever portion is smaller than that of the clamping portion; and a reflective shell, comprising:

a reflective shell side plate having an engagement hole, the engagement hole having an opening and a sliding slot communicating with the opening, the opening having a hole width greater than a slot width of the sliding slot, wherein the engagement structure is inserted into the opening such that the clamping portion protrudes over an external side surface of the reflective shell side plate, wherein the cantilever portion slides into the sliding slot while the engagement structure is inserted into the opening such that part of the reflective shell side plate beside the sliding slot is positioned between the clamping portion and the bezel side plate, and the reflective shell are combined wit the bezel.

13. The backlight module according to claim 12, wherein a distance formed between the clamping portion and the external side surface of the bezel side plate is larger than a thickness of part of the reflective shell side plate beside the sliding slot.

14. The backlight module according to claim 12, wherein a distance formed between the clamping portion and the external side surface of the bezel side plate is equal to a thickness of part of the reflective shell side plate beside the sliding slot.

15. The backlight module according to claim 12, wherein the reflective shell further comprises a reflective shell top plate connected to the reflective shell side plate, wherein an interval is defined between a bottom surface of the reflective shell top plate and a top surface of the bezel side plate when the bezel are combined with the reflective shell.

16. A backlight module, comprising:

a bezel, comprising:

a bezel side plate; and an engagement structure protruding over an external side surface of the bezel side plate, comprising:

a clamping portion having a first end and a second end, wherein the first end is connected to the bezel side plate, wherein a gap is formed between the clamping portion and the external side surface of the bezel side plate; and a cantilever portion having a third end connected to the bezel side plate and a fourth end connected to the second end, wherein a width of the cantilever portion is smaller than that of the clamping portion; and a reflective shell, comprising:

a reflective shell side plate having an engagement hole, the engagement hole having an opening and a sliding slot communicating with the opening, the opening having a hole width greater than a slot width of the sliding slot, wherein the opening and the sliding slot are for receiving the engagement structure;

wherein the width of the sliding slot is larger than or equal to that of the cantilever portion, but smaller than that of the clamping portion, the gap is for receiving part of the reflective shell side plate beside the sliding slot.

17. The backlight module according to claim 16, wherein the gap is larger than a thickness of part of the reflective shell side plate beside the sliding slot.

18. The backlight module according to claim 16, wherein the gap is equal to a thickness of part of the reflective shell side plate beside the sliding slot.

19. The backlight module according to claim 16, wherein the reflective shell further comprises a reflective shell top plate connected to the reflective shell side plate, wherein an interval is defined between a bottom surface of the reflective shell top plate and a top surface of the bezel side plate when the bezel are combined with the reflective shell.

* * * * *